(12) United States Patent
Nelson et al.

(10) Patent No.: US 10,723,216 B2
(45) Date of Patent: Jul. 28, 2020

(54) SHAFT FLOW COUPLER FOR HYBRID ASSEMBLY

(71) Applicant: Schaeffler Technologies AG & Co. KG, Herzogenaurach (DE)

(72) Inventors: Kyle Nelson, Dover, OH (US); Peter Rentfrow, Smithville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 324 days.

(21) Appl. No.: 15/922,370

(22) Filed: Mar. 15, 2018

(65) Prior Publication Data

US 2019/0283565 A1 Sep. 19, 2019

(51) Int. Cl.
| | |
|---|---|
| *B60K 6/387* | (2007.10) |
| *B60K 6/48* | (2007.10) |
| *B60K 17/02* | (2006.01) |
| *F16H 45/02* | (2006.01) |
| *B60K 6/405* | (2007.10) |

(52) U.S. Cl.
CPC .............. *B60K 6/387* (2013.01); *B60K 6/405* (2013.01); *B60K 6/48* (2013.01); *B60K 17/02* (2013.01); *F16H 45/02* (2013.01); *B60K 2006/4825* (2013.01); *F16H 2045/021* (2013.01); *F16H 2045/0205* (2013.01); *F16H 2045/0215* (2013.01); *F16H 2045/0221* (2013.01)

(58) Field of Classification Search
CPC ............................... B60K 17/00; B60K 17/02; B60K 2006/4816; B60K 2006/4825; B60K 6/38; B60K 6/387; B60K 6/40; B60K 6/405; B60K 6/48; F16H 2061/0046; F16H 45/02; F16H 2045/0205–0294
See application file for complete search history.

(56) References Cited

U.S. PATENT DOCUMENTS

| | | | |
|---|---|---|---|
| 2010/0081540 A1* | 4/2010 | Krause ................... | B60K 6/405 477/3 |
| 2010/0105519 A1* | 4/2010 | Kasuya .................. | B60K 6/405 477/5 |
| 2011/0118079 A1* | 5/2011 | Mueller .................. | F16D 21/06 477/5 |
| 2013/0087225 A1 | 4/2013 | Frait et al. | |

(Continued)

FOREIGN PATENT DOCUMENTS

JP 5943127 B1 6/2016

*Primary Examiner* — Jacob S. Scott

(57) ABSTRACT

A hybrid assembly, including: a torque converter; a shaft; a hybrid module; and a module hub. The torque converter includes: a cover; an impeller; a turbine; a stator; and an output hub arranged to non-rotatably connect to a transmission input shaft. The shaft is arranged to receive torque and includes a channel. The hybrid module includes: an electric motor including a stator and a rotor non-rotatably connected to the cover; and a transfer clutch arranged to control transmission of the torque from the shaft to the cover. The hub is non-rotatably connected to the cover and includes a channel: connected to the torque converter; and arranged to receive first pressurized fluid from a first channel in the transmission input shaft. The channel of the shaft is arranged to receive second pressurized fluid, from a second channel in the transmission input shaft, to control operation of the transfer clutch.

20 Claims, 6 Drawing Sheets

(56) References Cited

U.S. PATENT DOCUMENTS

2016/0105060 A1 4/2016 Lindemann et al.
2016/0244053 A1 8/2016 Hartz et al.
2017/0122421 A1 5/2017 Frait et al.

* cited by examiner

SHAFT FLOW COUPLER FOR HYBRID ASSEMBLY

TECHNICAL FIELD

The present disclosure relates to a hybrid assembly including a module hub with at least one channel to enable transmission of fluid from a transmission input shaft to a transfer clutch of a hybrid module of the hybrid assembly without drilling or operating on a housing for the hybrid module.

BACKGROUND

It is known to add a hybrid module to a drive train for an internal combustion engine. The hybrid module includes an electric motor and a transfer clutch that controls transmission of torque from the internal combustion engine through the hybrid module. The hybrid module does not include an on-board pump and fluid system for control of the transfer pump and cooling of the hybrid module and must be connected to the pump system for the transmission. To provide the connection to the transmission pump system, holes can be drilled into a housing for the hybrid module.

SUMMARY

According to aspects illustrated herein, there is provided a hybrid assembly, including: a torque converter; a module shaft; a hybrid module; and a module hub. The torque converter includes: a cover; an impeller; a turbine in fluid communication with the impeller; a stator; and an output hub arranged to non-rotatably connect to a transmission input shaft. The module shaft is arranged to receive torque and includes a first module shaft channel. The hybrid module includes: an electric motor including a motor stator and a rotor non-rotatably connected to the cover; and a transfer clutch arranged to control transmission of the torque from the module shaft to the cover. The module hub is non-rotatably connected to the cover and includes a first module hub channel: with a first port connected to the torque converter; and arranged to receive first pressurized fluid from a first transmission channel in the transmission input shaft. The first module shaft channel is arranged to receive second pressurized fluid, from a second transmission channel in the transmission input shaft, to control operation of the transfer clutch.

According to aspects illustrated herein, there is provided a hybrid assembly, including: a torque converter; a module shaft; a hybrid module; and a module hub. The torque converter includes: a cover; an impeller; a turbine in fluid communication with the impeller; a stator; and an output hub arranged to non-rotatably connect to a transmission input shaft. The module shaft: is arranged to receive torque; and includes a module shaft channel arranged to receive first pressurized fluid from a first transmission channel in the transmission input shaft. The hybrid module includes: an electric motor including a motor stator and a rotor non-rotatably connected to the cover; and a transfer clutch: in fluid communication with the module shaft channel; and arranged to control transmission of the torque from the module shaft to the cover. The module hub: is non-rotatably connected to the cover; and includes a module hub channel connected to the torque converter and arranged to receive second pressurized fluid from a second transmission channel in the transmission input shaft. The first pressurized fluid is arranged to close the transfer clutch to non-rotatably connect the shaft and the rotor.

According to aspects illustrated herein, there is provided a hybrid assembly, including: a torque converter; a hybrid module; a module hub; and a module shaft. The torque converter includes: a cover; an impeller; a turbine in fluid communication with the impeller; a stator; and an output hub arranged to non-rotatably connect to a transmission input shaft. The hybrid module includes: an electric motor including a motor stator and a rotor non-rotatably connected to the cover; and a transfer clutch arranged to control transmission of the torque from the shaft to the cover. The module hub is non-rotatably connected to the cover and includes: a first module hub channel connected to the torque converter and arranged to receive first pressurized fluid from a first transmission channel in the transmission input shaft; and a second module shaft channel arranged to receive second pressurized fluid from a second transmission channel in the transmission input shaft. The module shaft is arranged to receive torque and includes: a first module shaft channel connected to the second module hub channel and to the transfer clutch; and a second module shaft channel open to an interior of the hybrid module and arranged to receive third pressurized fluid from a third transmission channel of the transmission input shaft. The first module shaft channel is arranged to receive the second pressurized fluid to control operation of the transfer clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 6:
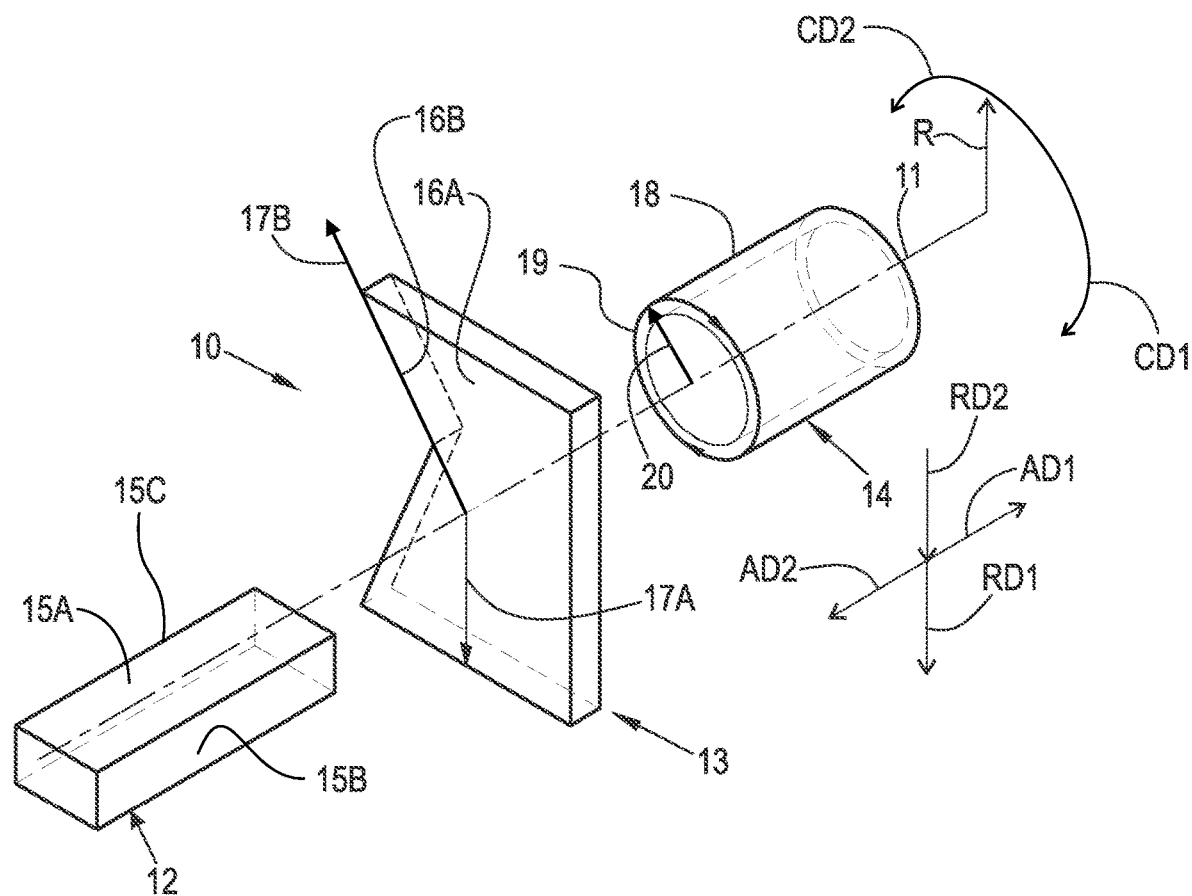
FIG. 6 is a perspective view of a cylindrical coordinate system demonstrating spatial terminology used in the present application.

FIG. 6 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
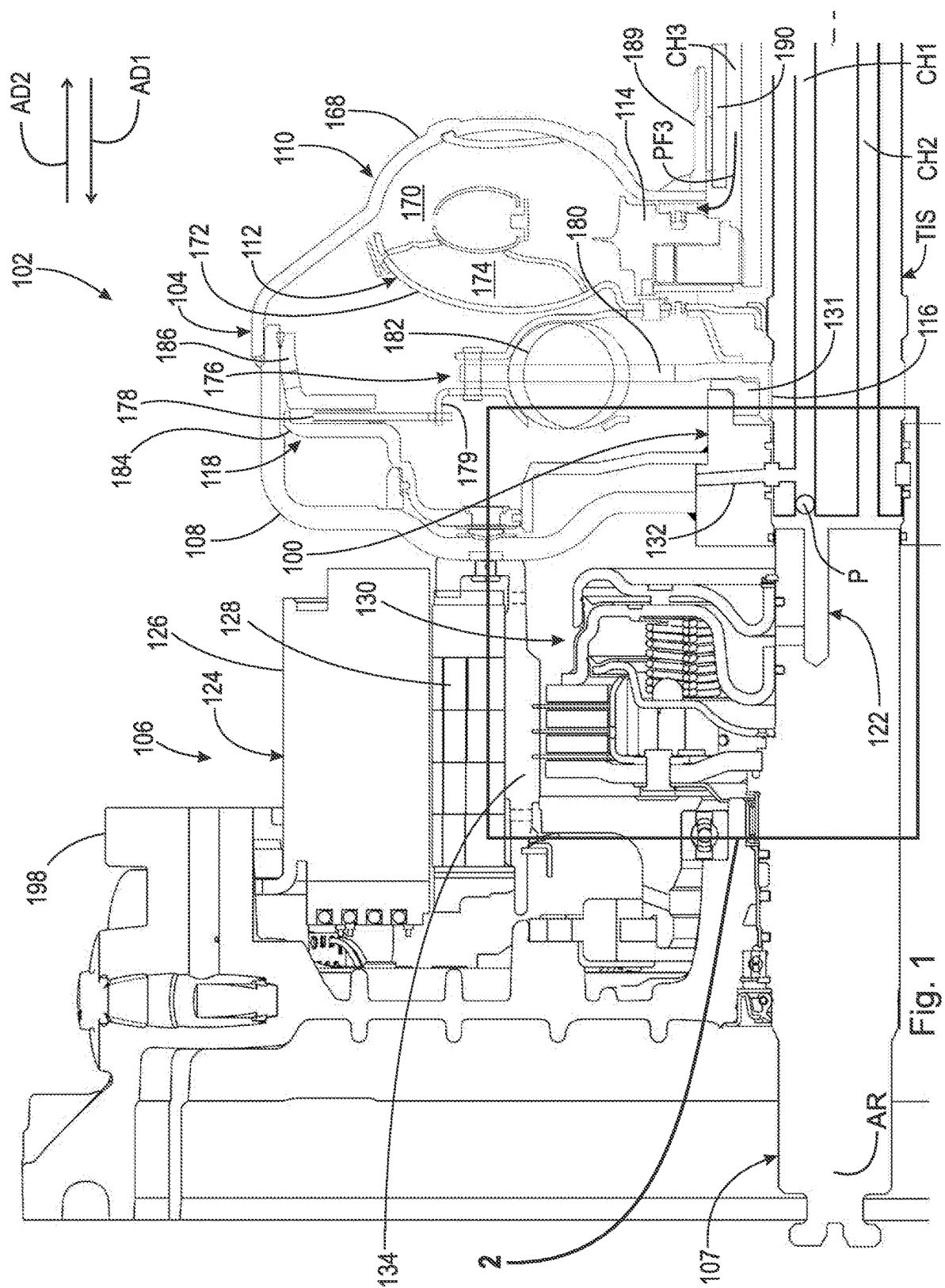
FIG. 1 is a cross-sectional view of a hybrid assembly with a single channel fluid module hub.

FIG. 1 is a cross-sectional view of a hybrid assembly with a single channel fluid module hub 100.

Figure 2:
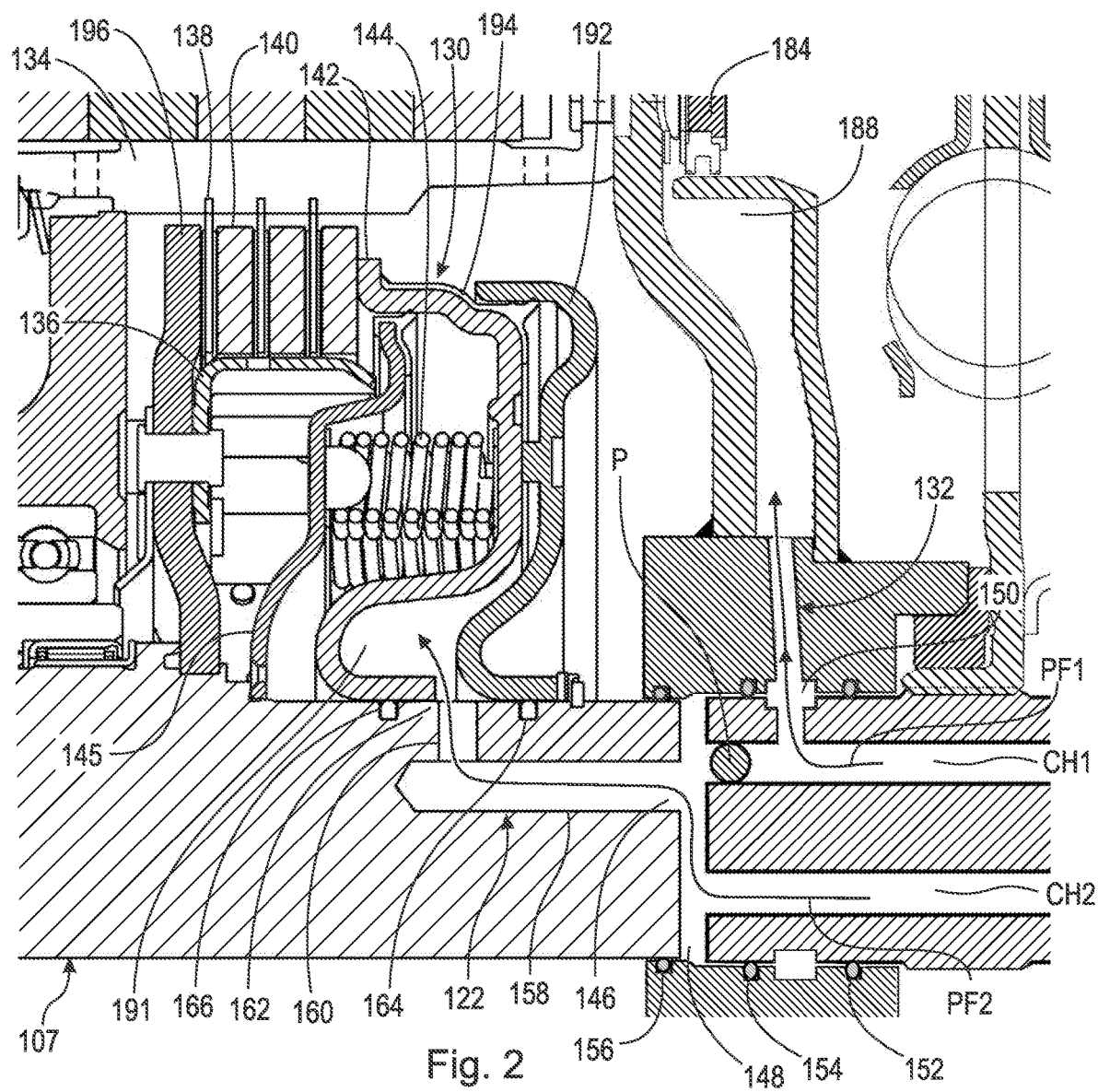
FIG. 2 is a detail of area 2 in FIG. 1.

FIG. 2 is a detail of area 2 in FIG. 1. The following should be viewed in light of FIGS. 1 and 2. Hybrid assembly 102 includes: axis of rotation AR; torque converter 104; hybrid module 106; shaft 107; and module hub 100. Shaft 107 is free to rotate with respect to hub 100. Torque converter 104 includes: cover 108; impeller 110; turbine 112 in fluid communication with impeller 110; stator 114; output hub 116 arranged to non-rotatably connect to transmission input shaft TIS; and lock-up clutch 118. Shaft 107 is arranged to receive rotational torque, for example from an internal combustion engine (not shown) and includes channel 122. Hybrid module 106 includes: electric motor 124 including stator 126 and rotor 128 non-rotatably connected to cover 108; and transfer clutch 130 arranged to control transmission of the torque from shaft 107 to cover 108. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required. In an example embodiment, torque converter 104 includes connecting plate 131 non-rotatably connected to hub 100 and output hub 116.

Hub 100 is non-rotatably connected to cover 108 and includes channel 132 opening to torque converter 102. Channel 132 in hub 100 is arranged to receive pressurized fluid PF1 from channel CH1 in transmission input shaft TIS. Channel 122 is arranged to receive pressurized fluid PF2, from channel CH2 in input shaft TIS to control operation of transfer clutch 130.

In an example embodiment, pressurized fluid PF2 is arranged to close transfer clutch 130 to non-rotatably connect shaft 107 and rotor 128. In an example embodiment, module 106 includes rotor carrier 134 non-rotatably connected to rotor 128 and cover 108. In an example embodiment, transfer clutch 130 includes: clutch carrier 136 non-rotatably connected to shaft 107; at least one plate 138 non-rotatably connected to rotor carrier 134; at least one plate 140 non-rotatably connected to clutch carrier 136; and piston plate 142. For a connect mode for transfer clutch 130, pressurized fluid PF2 is arranged to displace piston plate 142 in axial direction AD1 to non-rotatably connect shaft 107, clutch carrier 136, plates 138, plates 140, rotor carrier 134, rotor 128 and cover 108. In an example embodiment, transfer clutch 130 includes resilient element 144 and for a disconnect mode for transfer clutch 130, resilient element 144 is arranged to displace piston plate 142 in direction AD2, opposite direction AD1, to enable relative rotation between: rotor carrier 134 and clutch carrier 136, which in turn enables relative rotation between shaft 107 and cover 108. Element 144 reacts against fixed plate 145.

In an example embodiment, channel 122 includes port 146 open to, or connected to, space 148 axially disposed between shaft 107 and shaft TIS. By a channel or port being open to, connected to, or in fluid communication with a space, a component, another channel, or another port, we mean that fluid is able to flow from the channel or port to the space, the component, the other channel, or the other port. For example, the channel or port supplies pressurized fluid to the space, the component, the other channel, or the other port. In an example embodiment, shaft TIS includes plug P, sealing channel CH1 from space 148. Shaft 107 is free to rotate with respect to hub 100 and shaft TIS. Fluid PF2 flows through space 148 to channel 122 regardless of the circumferential orientation of shafts 107 and TIS.

In an example embodiment: channel 132 includes port 150 arranged to open to channel CH1; assembly 102 includes: seal 152 arranged to seal hub 100 against transmission input shaft TIS; seal 154 arranged to seal hub 100 against transmission input shaft TIS; and seal 156 sealing hub 100 against shaft 107. Port 150 is axially disposed between seals 152 and 154. Seals 154 and 156 seal space 148.

In an example embodiment: channel 122 includes portion 158 parallel to axis of rotation AR, and includes throughbore 160 with port 162 open to transfer clutch 130; module 106 includes seal 164 sealing hybrid module 106 against shaft 107, and includes seal 166 sealing hybrid module 106 against shaft 107; and port 162 is axially disposed between seals 164 and 166.

Impeller 110 includes impeller shell 168 and at least one impeller blade 170 non-rotatably connected to shell 168. Turbine 112 includes turbine shell 172 and at least one turbine blade 174 non-rotatably connected to shell 172.

In an example embodiment: torque converter 104 includes vibration damper 176; and clutch 118 includes output plate 178. Damper 176 includes: input plate 179 non-rotatably connected to plate 178; output flange 180 non-rotatably connected to output hub 116; at least one spring 182 engaged with plate 179 and flange 180. In an example embodiment: lock-up clutch 118 includes piston plate 184; plate 186 non-rotatably connected to cover 108; and apply chamber 188 bounded at least in part by cover 108 and piston plate 184. Channel 132 feeds fluid PF1 into chamber 188 to displace piston plate 184 in direction AD2 to non-rotatably connect cover 108 and damper 176 via piston plate 184, input plate 178, plate 186, and plate 179. Torque converter 104 is arranged to receive pressurized fluid PF3 from channel CH3, formed by impeller hub 189 and stator shaft 190, to cool torque converter 104 and open clutch 118.

In the example of FIG. 1, clutch 130 is a normally open clutch and includes apply chamber 191 formed by piston plate 142 and plate 192. Seal 194 seals plates 142 and 192. Fluid PF2 is transmitted to apply chamber 191 to displace piston plate 142 in direction AD1 to close clutch 130 as described above. In the absence of fluid PF2, or when a force from PF2 is less than the force from resilient element 144 in direction AD2, element 144 displaces piston plate 142 in direction AD2 to open clutch 130. In the example of FIG. 1, carrier 136 is non-rotatably connected to drive plate 196, which is non-rotatably connected to shaft 107.

Assembly 100 avoids the problem noted above of drilling holes in a hybrid module housing to transmit operational fluid to the hybrid module. Transmission input shafts typically include multiple channels. Shaft TIS includes at least two channels: channel CH1 and channel CH2. Torque converter 104 requires the use of only channel CH1. Hub 100, seals 152, 154, and 156, and plug P provide a means of using channel CH1 to supply fluid PF1 to torque converter 104, while simultaneously enabling the use of channel CH2 to provide fluid PF2 for transfer clutch 130. Thus, in the example of FIG. 1, independent control of clutches 118 and 130 is enabled, and expensive and time-consuming alterations of module 106, in particular of housing 198, are eliminated.

Figure 3:
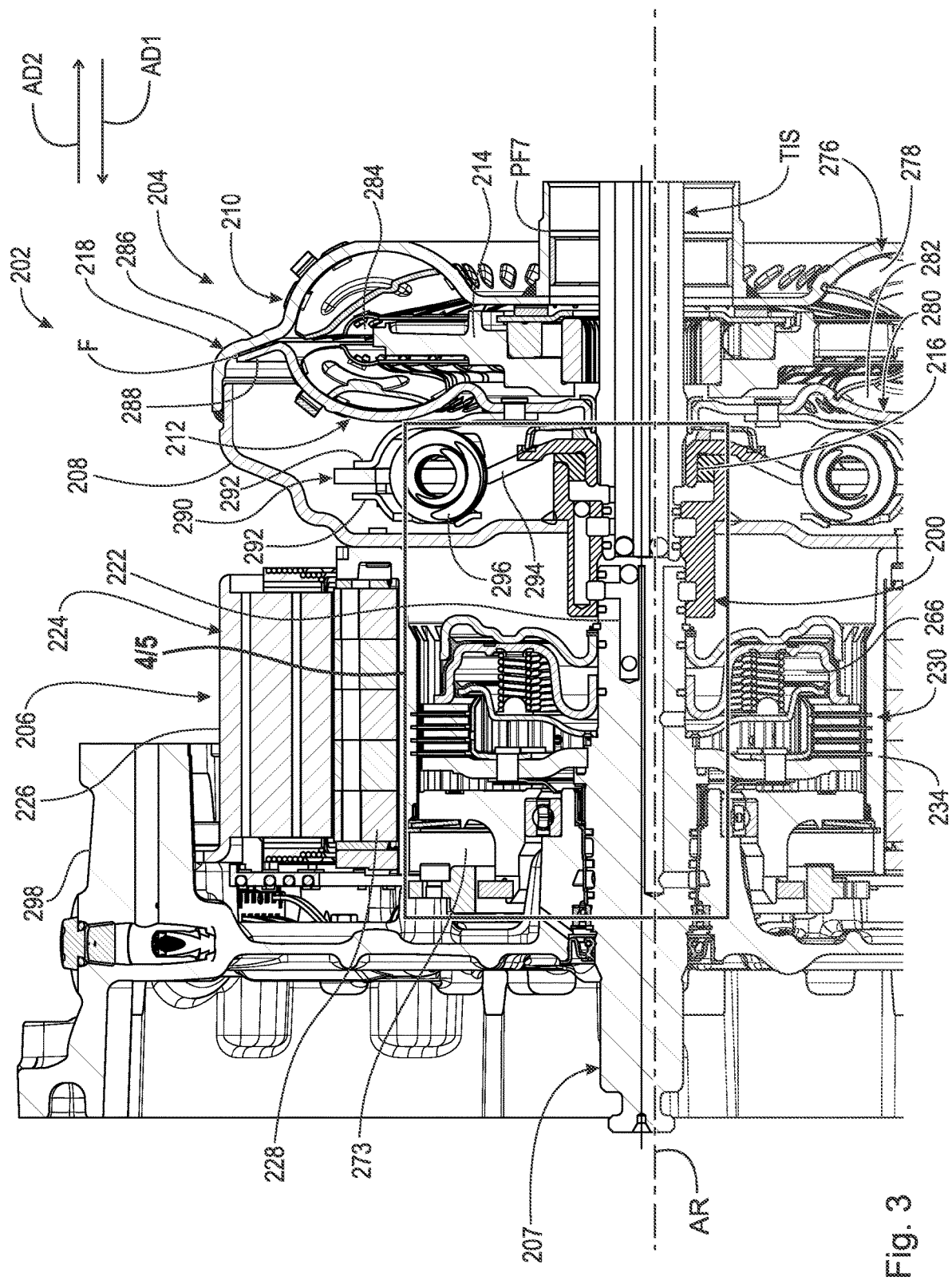
FIG. 3 is a cross-sectional view of a hybrid module with a multiple channel fluid module hub.

FIG. 3 is a cross-sectional view of a hybrid module with multiple channel fluid module hub 200.

Figure 4:
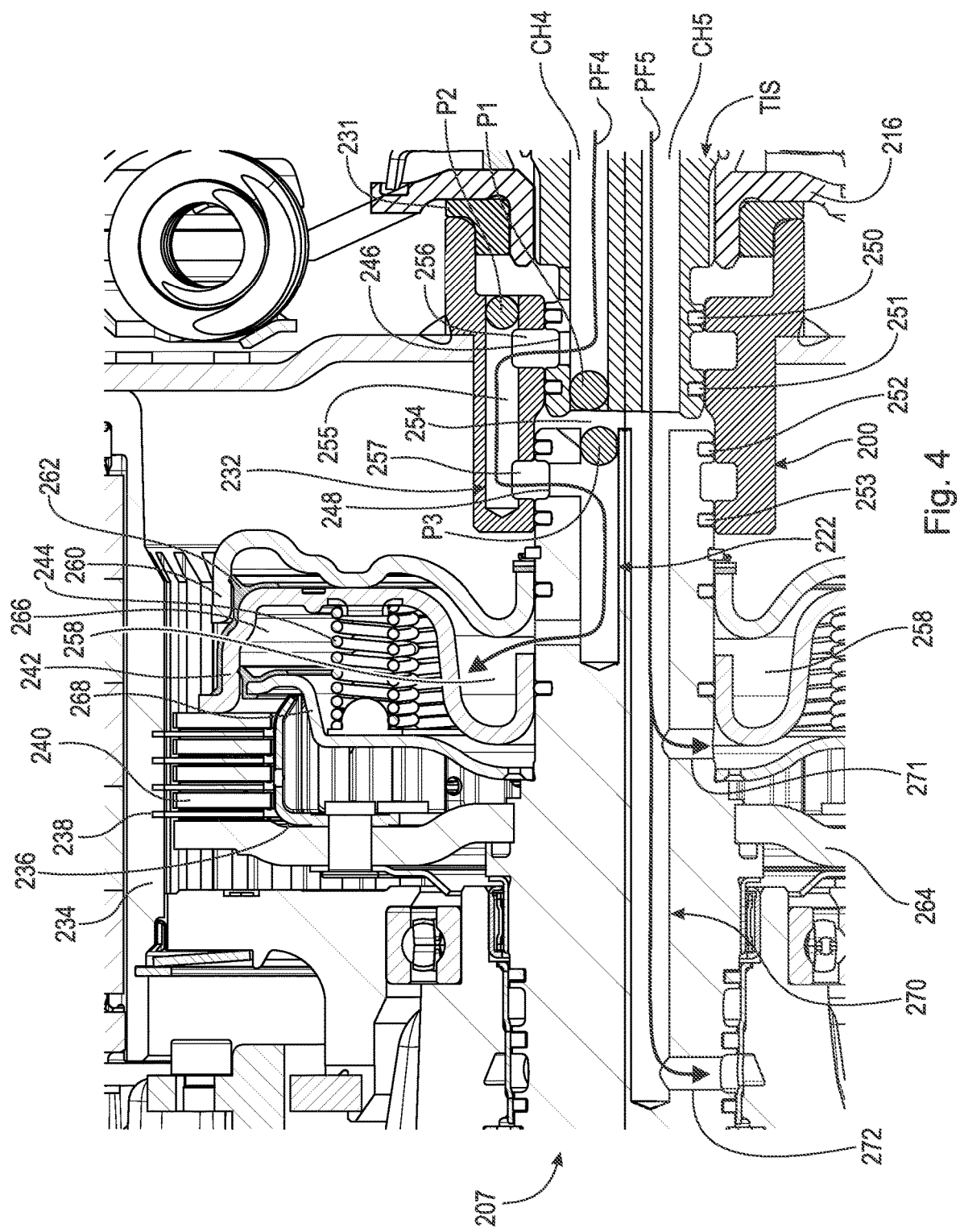
FIG. 4 is a detail of area 4/5 in FIG. 3.

FIG. 4 is a detail of area 4/5 in FIG. 3. The following should be viewed in light of FIGS. 3 and 4. Hybrid assembly 202 includes: axis of rotation AR; torque converter 204; hybrid module 206; shaft 207; and module hub 200. Torque converter 204 includes: cover 208; impeller 210; turbine 212 in fluid communication with impeller 210; stator 214; output hub 216 arranged to non-rotatably connect to transmission input shaft TIS; and lock-up clutch 218. Shaft 207 is arranged to receive rotational torque, for example from an internal combustion engine (not shown) and includes channel 222. Hybrid module 206 includes: electric motor 224 including stator 226 and rotor 228 non-rotatably connected to cover 208; and transfer clutch 230 arranged to control transmission of the torque from shaft 207 to cover 208. In an example embodiment, torque converter 204 includes connecting plate 231 non-rotatably connected to hub 200.

Hub 200 is non-rotatably connected to cover 208 and includes channel 232 in fluid communication with channel 222 and arranged to receive pressurized fluid PF4 from channel CH4 in transmission input shaft TIS to control operation of transfer clutch 230.

In an example embodiment, pressurized fluid PF4 is arranged to close transfer clutch 230 to non-rotatably connect shaft 207, rotor 228, and cover 208. In an example embodiment, module 206 includes rotor carrier 234 non-rotatably connected to rotor 228 and cover 208. In an example embodiment, transfer clutch 230 includes: clutch carrier 236 non-rotatably connected to shaft 207; at least one plate 238 non-rotatably connected to rotor carrier 236; at least one plate 240 non-rotatably connected to clutch carrier 234; and piston plate 242. For a connect mode for transfer clutch 230, pressurized fluid PF4 is arranged to displace piston plate 242 in axial direction AD1 to non-rotatably connect shaft 207, carrier 236, plates 238, plates 240, rotor carrier 234, rotor 228, and cover 208. In an example embodiment, transfer clutch 230 includes resilient element 244 and for a disconnect mode for transfer clutch 230, resilient element 244 is arranged to displace piston plate 242 in direction AD2, opposite direction AD1, to enable relative rotation between clutch carrier 236 and rotor carrier 234.

In an example embodiment: channel 232 includes port 246 arranged to open to channel CH4 and includes port 248 open to channel 222; and assembly 202 includes seals 250-253. Seals 250 and 251 are arranged to seal hub 200 against transmission input shaft TIS. Seals 252 and 253 seal hub 200 against shaft 207. Seals 251 and 252 seal space 254 axially disposed between shaft 207 and shaft TIS. Port 246 is axially disposed between seals 250 and 251. Port 248 is axially disposed between seals 252 and 253.

In the example of FIG. 3, channel 232 includes: portion 255 parallel to axis AR; portion 256 connecting portion 255 to port 246; and portion 257 connecting portion 255 to port 248. In the example of FIG. 3, plugs P1-P3 plug channel CH4, channel 232, and channel 222, respectively.

In the example of FIG. 3, clutch 230 is a normally open clutch and includes apply chamber 258 formed by piston plate 242 and plate 260. Seal 262 seals plates 242 and 260. Fluid PF4 is transmitted to apply chamber 258 to displace piston plate 242 in direction AD1 to close clutch 230 as described above. In the absence of fluid PF4, or when a force from PF4 is less than the force from resilient element 244 in direction AD2, element 244 displaces piston plate 242 in direction AD2 to open clutch 230, for example to enable relative rotation between carriers 234 and 236. In the example of FIG. 3: carrier 236 is non-rotatably connected to drive plate 264, which is non-rotatably connected to shaft 207; and element 244 is disposed in release chamber 266 and reacts against fixed plate 268.

Shaft 207 includes channel 270. Channel 270 includes: portion 271 in fluid communication with chamber 266; and portion 272 in fluid communication with interior 273 of module 206. Channel 270 is arrange to receive pressurized fluid PF5 from channel CH5 of shaft TIS. Portion 271 is arranged to feed fluid PF5 to chamber 266 to dynamically balance clutch 230. Portion 272 is arranged to feed fluid PF5 to module 206 to cool module 206.

Figure 5:
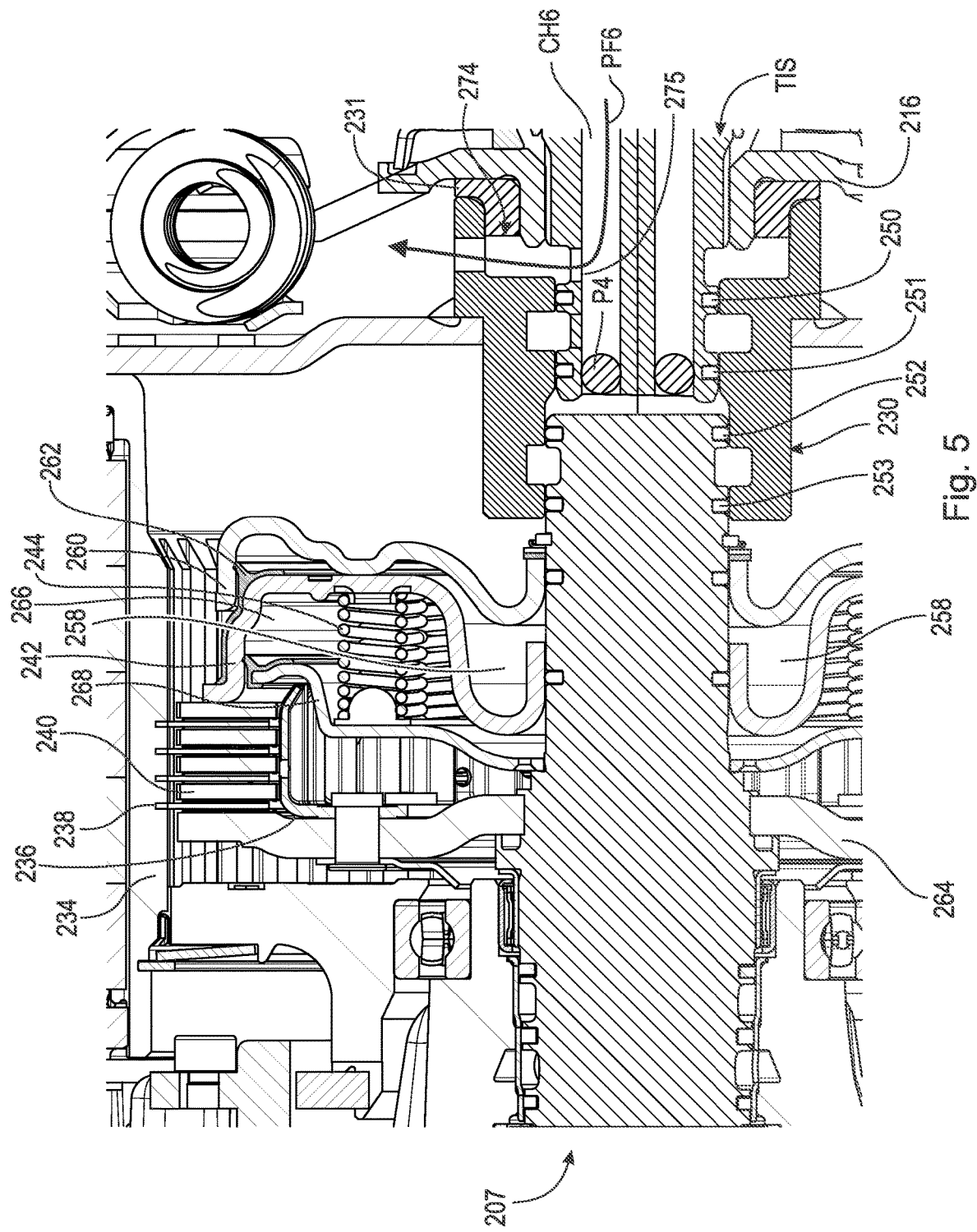
FIG. 5 shows area 4/5 in FIG. 4 rotated ninety degrees.

FIG. 5 shows area 4/5 in FIG. 4 rotated ninety degrees. The following should be viewed in light of FIGS. 3 through 5. In FIG. 5, the view is a cross-section taken after assembly 202 is rotated ninety degrees about axis AR. The rotation can be in either circumferential direction about axis AR. Hub 202 includes channel 274 arranged to receive pressurized fluid PF6 from channel CH6 in shaft TIS. Plug P4 plugs channel CH6. Channel 274 includes port 275 arranged to open to channel CH6. In an example embodiment, port 275 is axially disposed between seal 250 and output hub 216 and no seal is axially disposed between port 275 and output hub 216. In an example embodiment, channel 232 and channel 274 are circumferentially off-set by ninety degrees.

In the example of FIG. 3, torque converter 204 includes: impeller shell 276 non-rotatably connected to cover 208; at least one impeller blade 278 non-rotatably connected to shell 276; turbine shell 280; at least one turbine blade 282 non-rotatably connected to shell 280; and torus 284 between impeller 210 and turbine 212. Lock-up clutch 218 is a turbine clutch including portions 286 and 288 of shells 276 and 280, respectively. Friction material F is disposed between portions 286 and 288.

Fluid PF6 is arranged to displace turbine shell 280 in direction AD2 to non-rotatably connect portions 286 and 288, that is, to non-rotatably connect shells 276 and 280.

Torus 284 is arranged to receive pressurized fluid PF7 to displace shell 280 in direction AD1 to open clutch 218, to cool torque converter 204, and for operation of torque converter 204 in a torque converter mode.

In an example embodiment, torque converter 204 includes vibration damper 290 with: input plates 292 non-rotatably connected to turbine shell 280; output plate 294 non-rotatably connected to output hub 216; and at least one spring 296 engaged with plates 292 and plate 294.

Assembly 200 avoids the problem noted above of drilling holes in a hybrid module housing to transmit operational fluid to the hybrid module. Transmission input shafts typically include multiple channels. Shaft TIS includes at least three channels: channel CH4, channel CH5, and channel CH6. Torque converter 204 requires the use of only channel CH4. Hub 200, seals 250-253, and plugs P1-P4 provide a means of using channel CH4 to supply fluid PF4 to torque converter 204, while simultaneously enabling the use of channels CH5 and CH6 to provide fluid PF5 and fluid PF6, respectively, for operation of transfer clutch 230, dynamic balancing of clutch 230, and cooling of hybrid module 206. Thus, independent control of clutches 218 and 230, dynamic balancing of clutch 230, and cooling fluid for hybrid module 206 are enabled, and expensive and time-consuming alterations of module 206, in particular of housing 298 are eliminated.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
CH1 transmission channel
CH2 transmission channel
CH3 transmission channel
CH4 transmission channel
CH5 transmission channel
CH6 module hub channel
F friction material
P plug
P1 plug
P2 plug
P3 plug
P4 plug
PF1 pressurized fluid
PF2 pressurized fluid
PF3 pressurized fluid
PF4 pressurized fluid
PF5 pressurized fluid
PF6 pressurized fluid
TIS transmission input shaft
100 module hub
102 hybrid assembly
104 torque converter
106 hybrid module
107 module shaft
108 cover
110 impeller
112 turbine
114 stator
116 output hub
118 lock-up clutch
122 module shaft channel
124 electric motor
126 motor stator
128 rotor
130 transfer clutch
131 connecting plate
132 module hub channel
134 rotor carrier
136 clutch carrier
138 plate, clutch 130
140 plate, clutch 130
142 piston plate, clutch 130
144 resilient element
145 fixed plate
146 port, channel 122
148 space
150 port
152 seal
154 seal
156 seal
158 portion, channel 122
160 through-bore, channel 122
162 port, through-bore 160
164 seal
166 seal
168 impeller shell
170 impeller blade
172 turbine shell
174 turbine blade
176 vibration damper
178 output plate
179 input plate
180 output flange
182 spring
184 piston plate
186 plate
188 apply chamber, clutch 118
189 impeller hub
190 stator shaft
191 apply chamber, clutch 130
192 plate
194 seal
196 drive plate
198 housing
200 module hub 202 hybrid assembly
204 torque converter
206 hybrid module
207 module shaft
208 cover
210 impeller
212 turbine
214 stator
216 output hub
218 lock-up clutch
222 channel, shaft 207
224 electric motor
226 motor stator
228 rotor
230 transfer clutch
231 connecting plate
232 module hub channel
234 rotor carrier
236 clutch carrier
238 plate, clutch 230
240 plate, clutch 230
242 piston plate, clutch 230
244 resilient element
246 port
248 port
250 seal
251 seal
252 seal
253 seal
254 space
255 portion, channel 232
256 portion, channel 232
257 portion, channel 232
258 apply chamber, clutch 230
260 plate
262 seal
264 drive plate
266 release chamber
268 plate
270 module shaft channel
271 portion, channel 270
272 portion, channel 270
273 interior, module 206
274 module hub channel
275 port, channel 274
276 impeller shell
278 impeller blade
280 turbine shell
282 turbine blade
284 torus
286 portion, shell 276
288 portion, shell 280
290 vibration damper
292 input plate
294 output plate
296 spring
298 housing

The invention claimed is:
1. A hybrid assembly, comprising:
   a torque converter including:
      a cover;
      an impeller;
      a turbine in fluid communication with the impeller;
      a stator; and,
      an output hub arranged to non-rotatably connect to a transmission input shaft;
   a module shaft arranged to receive torque and including a first module shaft channel;
   a hybrid module including:
      an electric motor including:
         a motor stator; and,
         a rotor non-rotatably connected to the cover; and,
      a transfer clutch arranged to control transmission of the torque from the module shaft to the cover; and,
      a module hub:
         non-rotatably connected to the cover; and,
         including a first module hub channel:
            with a first port connected to the torque converter; and,
            arranged to receive first pressurized fluid from a first transmission channel in the transmission input shaft, wherein the first module shaft channel is arranged to receive second pressurized fluid, from a second transmission channel in the transmission input shaft, to control operation of the transfer clutch.
2. The hybrid assembly, of claim 1, wherein the second pressurized fluid is arranged to close the transfer clutch to non-rotatably connect the module shaft and the rotor.
3. The hybrid assembly, of claim 1, wherein:
   the hybrid module includes a rotor carrier non-rotatably connected to the rotor and to the cover;
   the transfer clutch includes:
      a clutch carrier non-rotatably connected to the module shaft;
      at least first plate non-rotatably connected to the rotor carrier;
      at least one second plate non-rotatably connected to the clutch carrier; and,
      a piston plate; and,
   for a connect mode of the transfer clutch, the second pressurized fluid is arranged to displace the piston plate in a first axial direction to non-rotatably connect the rotor carrier and the clutch carrier.
4. The hybrid assembly, of claim 3, wherein:
   the transfer clutch includes a resilient element; and,
   for a disconnect mode of the transfer clutch, the resilient element is arranged to displace the piston plate in a second axial direction, opposite the first axial direction, to enable relative rotation between the module shaft and the cover.
5. The hybrid assembly, of claim 1, wherein:
   the first module hub channel includes a port arranged to connect to the first transmission channel;
   the module hub includes:
      a first seal arranged to seal the module hub against the transmission input shaft; and,
      a second seal arranged to seal the module hub against the transmission input shaft; and,
   the port of the first module hub channel is axially disposed between the first seal and the second seal.
6. The hybrid assembly, of claim 5, further comprising:
   an axis of rotation, wherein:
   the first module shaft channel includes:
      a portion parallel to the axis of rotation; and,
      a through-bore with a port connected to the transfer clutch;
   the hybrid module includes:
      a first seal sealing the hybrid module against the module shaft; and,
      a second seal sealing the hybrid module against the module shaft; and, the port of the through-bore of the first module shaft channel is axially disposed between the first seal and the second seal of the hybrid module.

7. The hybrid assembly, of claim 6, wherein:
the module hub includes a third seal sealing the module hub against the module shaft;
the first module shaft channel is arranged to open to a space between the module shaft and the transmission input shaft; and,
the second seal of the module hub and the third seal of the module hub are arranged to seal the space.

8. The hybrid assembly, of claim 1, wherein:
the module hub includes a first seal arranged to seal the module hub against the transmission input shaft;
at least a portion of the first module hub channel is axially disposed between the first seal and the output hub; and,
no second seal is axially disposed between the first seal and the output hub.

9. The hybrid assembly, of claim 1, wherein:
the module hub includes a second module hub channel in fluid communication with the first module shaft channel; and,
the second module hub channel is arranged to receive the second pressurized fluid from the second transmission channel in the transmission input shaft.

10. The hybrid assembly, of claim 9, wherein the first module hub channel and the second module hub channel are circumferentially off-set by 90 degrees.

11. The hybrid assembly, of claim 9, wherein:
the module hub includes:
a first seal arranged to seal the module hub against the transmission input shaft;
a second seal arranged to seal the module hub against the transmission input shaft;
a third seal sealing the module hub against the module shaft; and,
a fourth seal sealing the module hub against the module shaft; and, the second module hub channel includes:
a first port axially disposed between the first seal and the second seal; and,
a second port axially disposed between the third seal and the fourth seal.

12. The hybrid assembly, of claim 1, wherein the module shaft includes a second module shaft channel:
in fluid communication with the hybrid module; and,
arranged to receive third pressurized fluid from a third transmission channel in the transmission input shaft.

13. The hybrid assembly, of claim 12, wherein the second module shaft channel is arranged to receive the third pressurized fluid from an axial space between the module shaft and the transmission input shaft.

14. The hybrid assembly, of claim 4, wherein:
the module shaft includes a second module shaft channel arranged to receive third pressurized fluid from a third transmission channel in the transmission input shaft;
the transfer clutch includes a release chamber bounded at least in part by the piston plate and a first plate non-rotatably connected to the module shaft;
the resilient element is disposed in the release chamber; and,
the second module shaft channel includes a first port connected to the release chamber.

15. The hybrid assembly, of claim 14, wherein the second module shaft channel includes a second port connected to an interior of the hybrid module.

16. The hybrid assembly, of claim 1, wherein:
the torque converter includes:
a lockup clutch with a piston plate; and,
a vibration damper with an input plate; and,
the first pressurized fluid is arranged to axially displace the piston plate to non-rotatably connect the cover and the input plate.

17. The hybrid assembly, of claim 1, wherein:
the impeller includes:
an impeller shell non-rotatably connected to the cover; and,
at least one impeller blade non-rotatably connected to the impeller shell; and,
the turbine includes:
a turbine shell; and,
at least one turbine blade non-rotatably connected to the turbine shell; and,
the torque converter includes a lockup clutch including a portion of the turbine shell and a portion of the impeller shell, wherein the first pressurized fluid is arranged to axially displace the turbine shell to non-rotatably connect the portion of the turbine shell and the portion of the impeller shell.

18. A hybrid assembly, comprising:
a torque converter including:
a cover;
an impeller;
a turbine in fluid communication with the impeller;
a stator; and,
an output hub arranged to non-rotatably connect to a transmission input shaft;
a module shaft:
arranged to receive torque; and,
including a module channel arranged to receive first pressurized fluid from a first transmission channel in the transmission input shaft;
a hybrid module including:
an electric motor including:
a motor stator; and,
a rotor non-rotatably connected to the cover; and,
a transfer clutch:
in fluid communication with the module channel; and,
arranged to control transmission of the torque from the module shaft to the cover; and,
a module hub:
non-rotatably connected to the cover; and,
including a module hub channel:
connected to the torque converter; and,
arranged to receive second pressurized fluid from a second transmission channel in the transmission input shaft, wherein the first pressurized fluid is arranged to close the transfer clutch to non-rotatably connect the module shaft and the rotor.

19. A hybrid assembly, comprising:
a torque converter including:
a cover;
an impeller;
a turbine in fluid communication with the impeller;
a stator; and,
an output hub arranged to non-rotatably connect to a transmission input shaft;
a module shaft arranged to receive torque;
a hybrid module including:
an electric motor including:
a stator; and,
a rotor non-rotatably connected to the cover; and,
a transfer clutch arranged to control transmission of the torque from the module shaft to the cover; and, a module hub non-rotatably connected to the cover and including:
  a first module hub channel:
    connected to the torque converter; and,
    arranged to receive first pressurized fluid from a first transmission channel in the transmission input shaft; and,
  a second module hub channel arranged to receive second pressurized fluid from a second transmission channel in the transmission input shaft, wherein the module shaft includes:
  a first module shaft channel connected to the second module hub channel and to the transfer clutch; and,
  a second module shaft channel open to an interior of the hybrid module and arranged to receive third pressurized fluid from a third transmission channel of the transmission input shaft, wherein the first module shaft channel is arranged to receive the second pressurized fluid to control operation of the transfer clutch.

20. The hybrid assembly, of claim 19, wherein the first module hub channel and the second module hub channel are circumferentially off-set by 90 degrees.

* * * * *